United States Patent Office 2,850,877
Patented Sept. 9, 1958

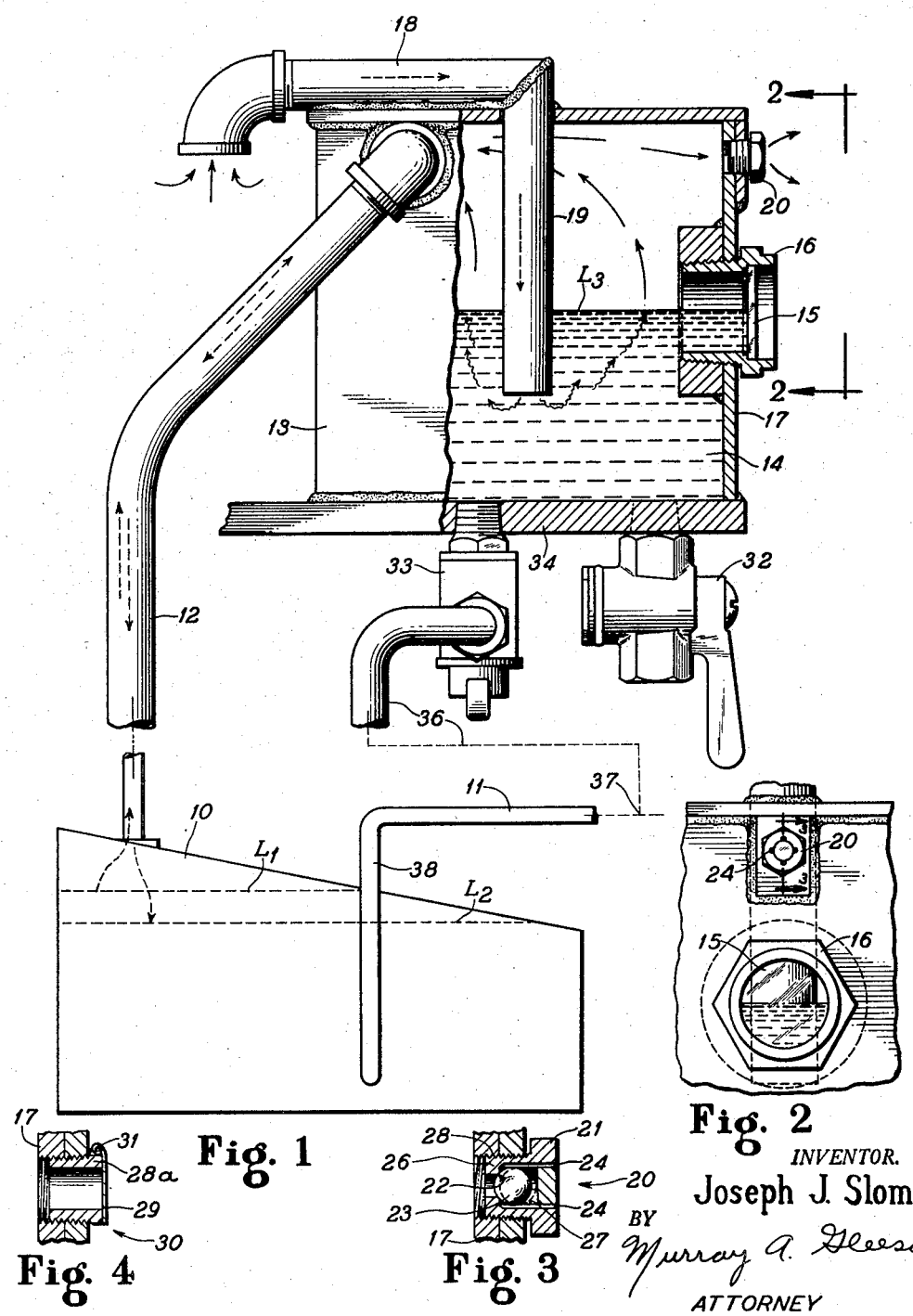

2,850,877

FILTER FOR HYDRAULIC SYSTEM

Joseph J. Slomer, Chicago, Ill., assignor to Goodman Manufacturing Company, Chicago, Ill., a corporation of Illinois Application May 17, 1954, Serial No. 430,202

4 Claims. (Cl. 60—52)

This invention relates generally to devices for maintaining hydraulic systems free from contamination by dust-laden air, and has particular reference to apparatus for preventing contamination of the hydraulic fluid in a reservoir occasioned by the changes in volume of the fluid stored therein.

Reservoirs for hydraulic systems vary in content of hydraulic fluid in accordance with the demand made by the various hydraulically operated devices connected thereto. The changing liquid content causes the reservoirs to "breathe," and the presence thereof in dirty atmospheres soon causes contamination. Previous efforts to control contamination by covering the reservoir with a membrane or diaphragm have not been entirely successful because of cost considerations. Also, the conventional air cleaner has not been entirely successful because it requires considerable time to service it for maximum efficiency.

According to the present invention, there is provided a simple auxiliary chamber which is connected to the reservoir of a hydraulic system, and which contains a supply of hydraulic fluid arranged to entrap dirt or foreign matter, yet permits the reservoir readily to refill with fluid when the hydraulic devices are connected to discharge back to the reservoir. The air relieved from the reservoir upon refilling thereof is arranged to escape without passing through the hydraulic fluid in the auxiliary chamber. A feature of the invention resides in the provision of means for rapidly discharging hydraulic fluid from the auxiliary chamber which may have become contaminated, and for refilling the auxiliary chamber from the reservoir with uncontaminated fluid. A further salient feature of the invention resides in the provision of a valve disposed in the auxiliary chamber which closes upon a reduction in the amount of fluid within the reservoir, and which offers no substantial resistance to flow of air from the auxiliary chamber upon refilling of the reservoir.

With the foregoing considerations in mind it is a principal object of this invention to provide an improved apparatus for use with the reservoir of a hydraulic system for preventing the ingress of contaminated air to the reservoir.

Other objects and important features of the invention will be apparent after a study of the following specification taken with the drawing, which together show some preferred embodiments of the invention, and what are now considered to be the best modes of practicing the principles thereof. Other embodiments of the invention may be suggested to those having the benefit of the teachings herein, and it is therefore intended that the scope of the invention not be limited by the embodiments herein shown, the scope of the invention being intended to be defined only by the claims subjoined.

In the drawing:

Fig. 1 is a partially schematic illustration of a part of an hydraulic system having the improvements according to the invention embodied therein, an auxiliary chamber connected therein being shown to approximately one-half scale, certain parts thereof being shown in vertical section more clearly to show certain details thereof;

Fig. 2 is an end view of the auxiliary chamber shown in Fig. 1, looking in the direction of the arrows 2—2 of Fig. 1, showing details of a bleed valve and an inspection port;

Fig. 3 is an enlarged detailed vertical sectional view through the bleed valve shown in Figs. 1 and 2; and Fig. 4 is another detail view of another embodiment of bleed valve, which may be employed with the apparatus according to the present invention.

Referring now to the drawing, the apparatus of the present invention is employed in connection with a closed tank or vessel 10 comprising a reservoir which is connected in a hydraulic system, not shown. The reservoir 10 is adapted to store a quantity of hydraulic fluid as may be demanded therefrom by various hydraulically operated devices connected in the system, and not shown. Such devices are arranged to exhaust the hydraulic fluid back to the reservoir 10 by means of a return line 11.

Such a reservoir 10 changes in its level according to the demands for hydraulic fluid which is supplied by a pump, not shown, to the aforesaid hydraulically operated devices, and the level therein may under such demand drop from a level indicated $L_1$ to $L_2$. Since such a reservoir is normally connected to atmosphere, the reservoir is subjected to an inrush of air from the ambient or must discharge in accordance with such changing level of the hydraulic fluid therein. In contaminated atmospheres, such as in a mine or the like, the reservoir soon becomes contaminated, to the consequent wear and damage of the various hydraulically operated devices connected in the hydraulic system.

In order to prevent ingress of contaminated air to the reservoir 10 upon the lowering of the fluid level therein, the reservoir 10 is connected by a pipe or conduit 12 to the upper part of an auxiliary chamber 13. The auxiliary chamber 13 contains a quantity of hydraulic fluid 14 and is filled to a level $L_3$, which level is visible through an inspection window 15 held in a fitting 16 threaded to a side wall 17 of the chamber 13. The chamber 13 is provided with an inlet pipe 18 having a vertical portion 19 which extends approximately 1" below the level $L_3$ of the hydraulic liquid within the reservoir 13.

Under conditions when the level within the reservoir 10 is dropping from the level $L_1$ to the level $L_2$, air passes through the chamber 13 from the ambient, but is cleaned by bubbling beneath the level $L_3$ of the hydraulic liquid within the chamber 13. The so cleaned air then leaves the chamber 13 by means of the pipe 12 connected to the reservoir 10.

However, when the liquid within the reservoir 10 rises from the level $L_2$ to the level $L_1$ the air thereabove must escape through the same auxiliary chamber 13. In so doing, the pressure thereof would normally be sufficient in amount to force the liquid 14 up through the pipes 19 and 18. The air leaving from the reservoir 10 is bypassed from the path just described by means of an escape valve indicated generally by the reference numeral 20. Such an escape valve 20 is of a type as to afford substantially no resistance to flow of the escaping air, and consists of a fitting 21 which is threaded into the side wall 17 of the auxiliary chamber 13. The fitting 21 has a seat 22 against which normally rests a ball 23, openings 24 being provided in the fitting for the escape of the air from the reservoir 10. The position of the ball 23 with reference to the seat 22 is such as to offer no substantial opposition to the movement of the air through the passages 24. At times when air enters the reservoir 10, enough differential pressure is manifested across the ball 23 and seat 22 to cause the ball 23 to move against the seat 22, to prevent any contaminated air from entering the system by way of the passages 24.

The fitting 21 may be formed by spinning a land 26 in the fashion shown after inserting the ball 23 in a bore 27 formed in the fitting. The passageways 24 may be drilled prior to the spinning operation described and after the spinning of the land 26 is accomplished, the threads 28 may be chased upon the fitting 21.

Referring to Fig. 4 of the drawings, there is shown another embodiment of the escape valve, indicated generally by the reference numeral 30. Such an escape valve is located in the wall 17 above the level $L_3$ of the liquid within the auxiliary chamber 13, and consists of a short nipple 28a having a flap type check valve 29 pivoted at 31 thereto. The check valve 29, as with the escape valve 20 seen in Fig. 3, likewise offers little or no resistance to the flow of air from within the chamber 13 and above the surface $L_3$ of the liquid therein, and will close by reason of the drop in pressure within chamber 13 occurring when the reservoir 10 is "breathing" air through the chamber 13.

Referring back to the Fig. 1 of the drawing, the auxiliary chamber 13 may be emptied by means of a drain valve referred to generally by the reference numeral 32 and disposed in the bottom 34 of the chamber 13. When the supply of the hydraulic fluid within the chamber 13 becomes contaminated it may readily be removed therefrom by opening the drain valve 32. The precise form of such valve forms no part of the present invention, and other forms than that shown may be provided without departing from the spirit of the invention.

Means are provided for rapidly refilling the auxiliary chamber 13 after it has been drained by valve 32 of contaminated liquid. To this end a filler valve 33 is disposed in the bottom 34 of the chamber 13. The filler valve 33 is connected by means of a conduit 36 at a juncture point 37 in the return line 11, at a point spaced from a discharge opening 38 of the return line 11 to the reservoir 10. In hydraulic systems of the general type contemplated in this invention, there exists a certain amount of back pressure in the return line from the various hydraulically connected devices in the system. Such back pressure existing at the junction point 37 is sufficient upon opening of the filler valve 33 to cause fluid to be discharged instead into the auxiliary chamber 13, the desired level of such liquid being readily ascertained by viewing at the inspection window 15. When the level within the auxiliary chamber 13 is raised to its proper level, the filler valve 33 may be closed, and the system is ready once more for a sequence of operations as previously described.

While the invention has been described in terms of some preferred embodiments thereof, the scope of the invention is intended to be limited only in terms of the claims here appended.

I claim as my invention:

1. In an hydraulic system the combination comprising, an enclosed reservoir for containing a supply of hydraulic fluid which fluctuates in accordance with the demand for pressure fluid by hydraulically operated apparatus connected in said system, an enclosed auxiliary chamber separate from said reservoir for containing a quantity of said hydraulic fluid, an air interchange conduit connected between said reservoir and said auxiliary chamber for moving air to or from said reservoir in accordance with the fluctuations of the hydraulic fluid supply in said reservoir, said air interchange conduit having one end thereof in open communication with said reservoir above the level of the fluid normally contained in said reservoir and the other end thereof in open communication with said auxiliary chamber above the level of the fluid normally contained in said auxiliary chamber, an air intake conduit connected to said auxiliary chamber, said air intake conduit having one end thereof open to atmosphere and the other end thereof disposed within said auxiliary chamber and opening thereinto at a level below the level of the hydraulic fluid normally contained therein so that air from atmosphere entering said auxiliary chamber through the air intake conduit in response to a movement of air from said auxiliary chamber to said reservoir is passed through and filtered by the fluid in said auxiliary chamber, and an air escape valve means in said auxiliary chamber for releasing air therefrom in response to a movement of air from said reservoir to said auxiliary chamber through said air interchange conduit, said valve means being located above the level of the fluid normally contained in said auxiliary chamber and opening in response to a positive pressure inside said auxiliary chamber which is less than the pressure head of said hydraulic fluid adjacent said other end of said air intake conduit.

2. The combination as set forth in claim 1 wherein said valve means comprises a seat and a flat valve member movable against said seat upon lowering of the pressure in said auxiliary chamber occasioned by air moving into said reservoir from said auxiliary chamber.

3. The combination as set forth in claim 1 wherein said valve means comprises a seat and a ball movable in substantially a horizontal direction toward and away from said seat, so as to present substantially no resistance to such movement except by the differential pressure across said ball and said seat.

4. In an hydraulic system the combination comprising, an enclosed reservoir for containing a supply of hydraulic fluid which fluctuates in accordance with the demand for pressure fluid by hydraulically operated apparatus connected in said system, an enclosed auxiliary chamber separate from said reservoir for containing a quantity of said hydraulic fluid, an air interchange conduit connected between said reservoir and said auxiliary chamber for moving air to and from said reservoir in accordance with the fluctuations of the hydraulic fluid supply in said reservoir, said air interchange conduit having one end thereof openly communicating with said reservoir above the level of the fluid normally contained in said reservoir and the other end thereof openly communicating with said auxiliary chamber above the level of the fluid normally contained in said auxiliary chamber, an air intake conduit connected to said auxiliary chamber and having one end thereof opening to atmosphere and the other end thereof disposed within said auxiliary chamber at a level below the level of the hydraulic fluid normally contained therein so that air from atmosphere entering said auxiliary chamber in response to a movement of air from said auxiliary chamber to said reservoir is passed through and filtered by the fluid in said auxiliary chamber, an air escape valve in said auxiliary chamber for releasing air from said auxiliary chamber in response to a movement of air from said reservoir to said auxiliary chamber, said air escape valve being located above the level of the fluid normally contained in said auxiliary chamber and opening in response to a positive pressure inside said auxiliary chamber, such pressure being less than the pressure head of said hydraulic fluid adjacent said other end of said air intake conduit, drain means in the bottom of said auxiliary chamber to permit the removal of dirty fluid therefrom, a return line associated with said reservoir for returning hydraulic fluid to the latter, and means connecting said auxiliary chamber and said return line for filling said auxiliary chamber by the pressure in said return line.

References Cited in the file of this patent

UNITED STATES PATENTS

| | | |
|---|---|---|
| 780,709 | Craig | Jan. 24, 1905 |
| 941,870 | Gathmann | Nov. 30, 1909 |
| 1,214,372 | Romberger | Jan. 30, 1917 |
| 1,427,241 | Sunderman | Aug. 29, 1922 |
| 1,644,101 | Anderson | Oct. 4, 1927 |
| 1,876,465 | Misner | Sept. 6, 1932 |
| 2,643,025 | Bell | June 23, 1953 |